United States Patent [19]
Michelet et al.

[11] 3,935,527
[45] Jan. 27, 1976

[54] INRUSH CURRENT LIMIT CIRCUIT WITH RESET RESPONSE TO LOWERED INPUT VOLTAGE

[75] Inventors: Robert Wilson Michelet, Madison; Roman Ostapiak, Pine Brook; Rudolph Scuderi, Mountain Lakes, all of N.J.

[73] Assignee: Bell Telephone Laboratories, Incorporated, Murray Hill, N.J.

[22] Filed: Aug. 14, 1974

[21] Appl. No.: 497,182

[52] U.S. Cl. .................. 321/11; 317/20; 317/31; 321/14; 323/96
[51] Int. Cl.² .......................................... H02M 1/18
[58] Field of Search ............... 321/10, 11, 14, 45 S; 317/20, 31, 49, 33 R; 323/96

[56] References Cited
UNITED STATES PATENTS

| | | | |
|---|---|---|---|
| 1,227,771 | 5/1917 | Foote | 323/96 |
| 2,280,945 | 4/1942 | Gamel et al. | 317/31 |
| 3,161,834 | 12/1964 | Noyes | 321/11 |
| 3,546,573 | 12/1970 | Coccia | 323/96 |
| 3,579,077 | 5/1971 | Cameron | 321/10 |
| 3,787,756 | 1/1974 | Berger | 321/10 |

FOREIGN PATENTS OR APPLICATIONS 862,099    3/1961    United Kingdom.................. 321/11

*Primary Examiner*—William M. Shoop
*Attorney, Agent, or Firm*—A. G. Steinmetz

[57] ABSTRACT

A converter circuit includes an inrush current limit circuit to limit the initial transient surge of inrush current to a power supply upon the initial application of voltage to the power supply input. After the initial start-up transient inrush current surge, the inrush current limit circuit is switched out of the input signal path to reduce power dissipation during normal steady state operation of the circuit. If the input voltage magnitude decreases significantly at any time, the inrush current limit circuit is reset to limit any further current surges.

4 Claims, 1 Drawing Figure

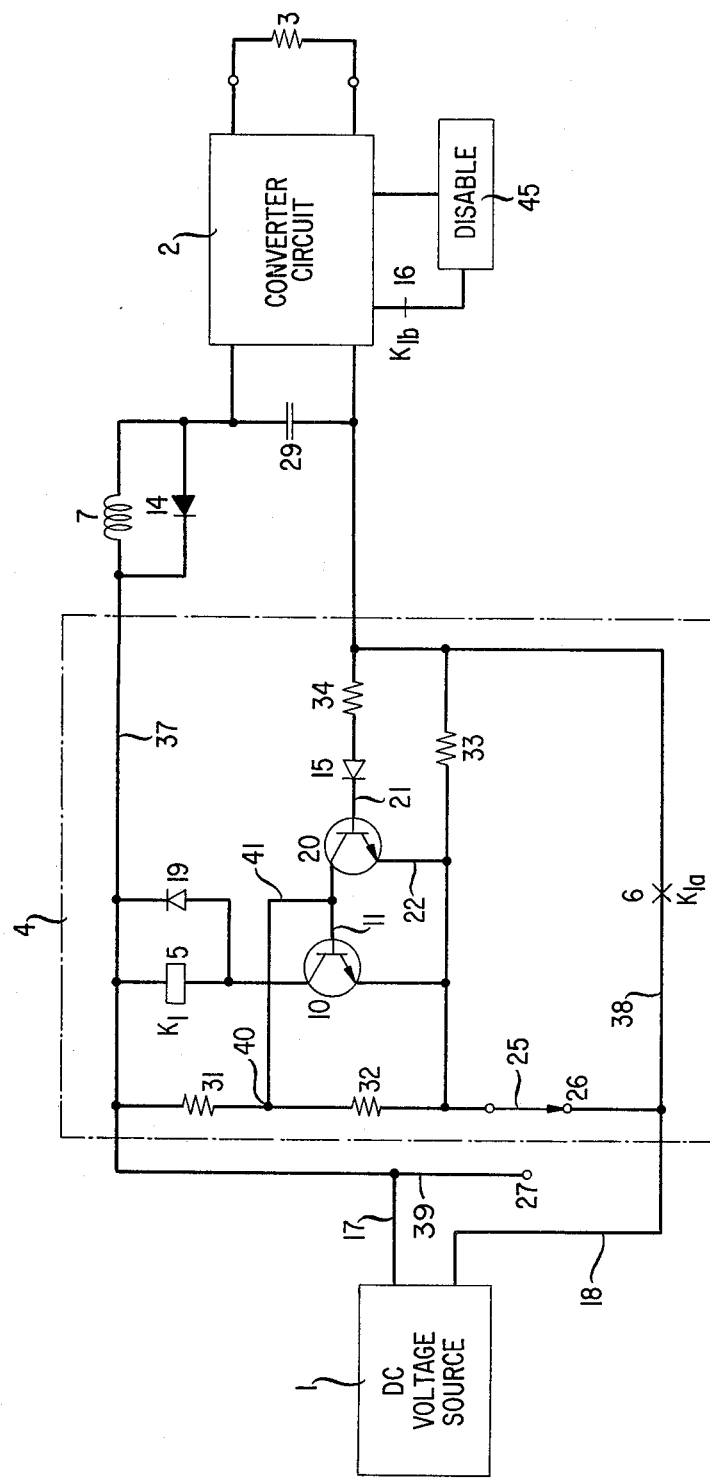

INRUSH CURRENT LIMIT CIRCUIT WITH RESET RESPONSE TO LOWERED INPUT VOLTAGE

BACKGROUND OF THE INVENTION

1. Field of the Invention

The invention relates to power supplies and, more particularly, to inrush surge current limit circuits. It is specifically concerned with automatic resetting of the inrush current limit circuit in response to a momentary drop of the input voltage to the power supply.

2. Description of the Prior Art

Power supplies generally include input filters to alleviate noise problems. The filter generally includes capacitive components which induce a large instantaneous transient current to the power supply when it is initially energized. The instantaneous transient current, known as the inrush current, can cause circuit breakers or fuses to operate and may damage the circuit components of the power supply.

The inrush current is normally limited to a safe value by inserting a large impedance in the input current path. The impedance may be switched out of the input path and a low impedance path substituted therefor after the initial inrush current transient has subsided. The substitution of the low impedance path may be performed manually or by an automatic system.

Manual switching systems are slow and insertion of the low impedance path is not related to the actual value of the input current. Prior automatic switching systems have operated on a fixed time delay or a time delay related to the stages of operation of the power supply which are unrelated to the actual magnitude or duration of the inrush current. This arrangement is inefficient since the input impedance dissipates power unnecessarily after the current inrush has ended. An additional disadvantage of these inrush current limiting arrangements is that should the input voltage to the power supply subsequently decrease, the inrush current limit circuit does not operate again to protect the power supply against the subsequent inrush current when the voltage level is restored.

It is, therefore, an object of the invention to limit the inrush current surge of a power supply for the exact duration of the inrush current.

It is another object of the invention to improve the efficiency of an inrush current limit circuit by bypassing the inrush current limit circuitry in response to a drop in the inrush current.

It is yet another object of the invention to reactivate the inrush current limit protection circuitry should the input voltage to the power supply decrease below a threshold value during operation of the circuit.

SUMMARY OF THE INVENTION

Therefore, in accordance with the invention, a power supply includes an inrush current limit circuit having a high impedance path and a low impedance path connected in the input signal path of the power supply. Upon the initial application of voltage to the power supply, the inrush or surge current flows through the high impedance path to the power supply. The high impedance limits the inrush current to a safe value to protect the circuit components of the power supply. A current sensing device monitors the inrush current. When the inrush current drops to a low value, the current sensing device activates switching circuitry to substitute the low impedance path for the high impedance path in the input circuit.

The inrush current limit circuit monitors the input voltage applied to the power supply and reactivates the inrush current limit circuit if the input voltage drops below some threshold. Upon reactivation of the inrush current limit circuit, it operates in the same fashion as described above.

BRIEF DESCRIPTION OF THE DRAWING

Other objects, features, and advantages of the invention will be more readily understood by reference to the following detailed description when considered in connection with the accompanying drawing wherein:

The sole FIGURE is a combined block diagram and circuit schematic of a power supply having an inrush current limit circuit according to the principles of the invention.

DETAILED DESCRIPTION

The power supply shown in the FIGURE includes an inrush current limit circuit according to the principles of the invention to prevent large inrush current surges when voltage is initially applied to the power supply circuit. The DC voltage source 1 applies a DC voltage to terminals 17 and 18. This voltage is coupled, via leads 37 and 38 of the inrush current limit circuit 4, to a converter circuit 2 which converts the DC voltage from one level to another level and applies a DC voltage to the load 3. The capacitor 29, shunting the input terminals of the converter circuit 2, represents the capacitances of the power supply circuit which are responsible for the initial inrush current.

The inrush current limit circuit 4 includes a current limit resistor 33 of a fairly large magnitude which serves to limit the initial current surge. The voltage dividers comprising resistors 31 and 32 shunt the input terminals 17 and 18, via the switch arm 25 connected to contact 26. A series connected $K_1$ relay coil 5 and transistor 10 shunt the voltage divider. The center junction 40 of the voltage divider is connected, via lead 41, to the base 11 of transistor 10. The collector-emitter path of transistor 20 shunts the base emitter path of transistor 10. The emitter 22, base 21, diode 15, and resistor 34 shunt the inrush current limit resistor 33. The lead 38 includes the $K_{1a}$ relay contact 6 which, when activated by the relay coil 5, completes a low impedance path in parallel with the inrush current limit resistor 33. The $K_{1b}$ relay contact 16 is normally closed until the relay coil 5 is activated. Its purpose is to connect the disabling means 45 to the converter 2 to inhibit its operation until the relay coil 5 is energized. This permits the input capacitance to charge up more rapidly upon initial energization since the converter draws no power. The disabling means may comprise a source voltage or similar means to bias the converter switching devices inoperative. The inrush current limit circuit is switched into the input current path by switching the switch arm 25 to contact 26 as shown in the FIGURE. The input to the converter circuit includes an inductor 7 which is shunted by a diode 14 to discharge stored energy therein.

Upon the initial application of power through the DC source 1 to terminals 17 and 18, current flows via lead 37 and inductor 7 to the capacitor 29 and the converter circuit 2. The return current path is initially via the current limit resistor 33, the switch arm 25 connected to contact 26, the terminal 18, and back to the DC voltage source 1. Initially the inrush current causes a large voltage drop across the resistor 33 and the transistor 20 is biased conducting. Current flows from the input terminal 17 via resistor 31, lead 41, and the collector emitter path of transistor 20, back to the terminal 18 connected to the DC voltage source 1. With transistor 20 conducting, the transistor 10 is biased nonconducting and no current flows through the relay coil 5. As the charge on the capacitor 29 increases, the voltage drop across the resistor 33 decreases. Eventually at a particular voltage threshold the transistor 20 becomes nonconducting and the current from the DC voltage source 1 flowing through resistor 31 and lead 41 biases the transistor 10 into conduction. With transistor 10 conducting, current flows through the relay coil 5, through the collector-emitter path of transistor 10, and the switch arm 25, back to the DC voltage source 1. When the relay coil 5 is energized, the contact 6 in lead 38 closes and the current path from the voltage source 1 to the converter cicuit 2 bypasses the current limit resistor 33. The relay contact 16 opens, permitting the converter 2 to operate normally.

A feature of the invention is the automatic reactivation of the inrush current limit circuit 4 should the voltage on DC source 1 drop below a certain threshold. If the input DC voltage drops sufficiently, the current flow to resistor 31, which is transmitted via lead 41 to base 11 of transistor 10, becomes insufficient to maintain the transistor 10 conducting. The transistor 10 becomes nonconducting and the relay coil 5 is deenergized. A diode 19 shunting the relay coil permits the discharge of the stored energy in the relay coil 5. With the relay coil 5 no longer energized, the contact 6 opens and the DC voltage source is now connected to the converter circuit, via the current limit resistor 33. The inrush current limit circuit 4 subsequently operates in the same fashion when the DC voltage is restored as when the power supply was initially energized. When the input current level drops to a sufficiently low value, the relay coil 5 is again energized, closing contact 6 to enable the low impedance path. An auxiliary path 39 can be completed by throwing switch 25 of contact 27. This permits the discharging of the capacitor 29 when the power supply is shut down.

It is apparent from the foregoing description that the inrush current limit circuit 4 limits initial transient current surges when the power supply is first energized and responds to any subsequent voltage drops of the DC voltage source 1 by reactivating the high impedance path including the current limit resistor 33 to prevent any subsequent current surges.

What is claimed is:

1. An inrush current limit circuit comprising, input terminals to accept a source, output terminals to accept a load, a current limit impedance connecting at least one of said input terminals to at least one of said output terminals, a low impedance path, means to connect said low impedance path in parallel with said current limit impedance, means to operate said means to connect, current sensing means connected to sense the current in said current limit impedance, voltage monitoring means connected to monitor the voltage at said input terminals, said means to operate responsive to said current sensing means at a current below a particular low current threshold to connect said low impedance path in parallel with said current limiting impedance, said means to operate being further responsive to said voltage monitoring means at a voltage below a particular low voltage threshold to disable said means to connect and disconnect said low impedance path from a parallel connection with said current limiting impedance.

2. An inrush current limit circuit as defined in claim 1 wherein, said current sensing means comprises a first transistor whose conductivity is responsive to a bias signal generated by said current limit impedance, and said means to operate comprises a second transistor whose conductivity is responsive to said first transistor, and a relay coil responsive to the collector current of said second transistor, and said means to connect comprises a relay contact responsive to said relay coil.

3. An inrush current limit circuit as defined in claim 2 wherein, said voltage monitoring means comprises a voltage divider shunted across the input terminals, and said means to operate includes means to utilize a voltage developed by said voltage divider to bias said second transistor nonconducting.

4. In a converter circuit, means to limit the converter input current upon energization of the circuit comprising, a high impedance situated in the path of the input current, a low impedance current path shunting said high impedance and including a make and break contact, a relay coil to control said contact, and means to control the energization of said relay coil including, a first transistor situated to complete an energization path for said relay coil, a second transistor connected to be biased in response to the voltage drop across said high impedance, said second transistor connected to control the bias of said first transistor, whereby said first transistor is biased conducting to energize said relay coil and, hence, enable said low impedance path in response to a decreased current through said high impedance, and means to bias the first transistor nonconducting should said input current decrease significantly including, a voltage divider energized by a portion of the input current and connected to the control electrode of said first transistor.

* * * * *